(12) United States Patent
Weber

(10) Patent No.: US 6,864,437 B2  
(45) Date of Patent: Mar. 8, 2005

(54) WEIGHT SET FOR AN ELECTRONIC BALANCE

(75) Inventor: René Weber, Oetwil an See (CH)

(73) Assignee: Mettler-Toledo GmbH, Greifensee (CH)

(*) Notice: Subject to any disclaimer, the term of this patent is extended or adjusted under 35 U.S.C. 154(b) by 153 days.

(21) Appl. No.: 10/295,934

(22) Filed: Nov. 15, 2002

(65) Prior Publication Data

US 2003/0098184 A1 May 29, 2003

(30) Foreign Application Priority Data

Nov. 27, 2001 (DE) ......................................... 101 57 804

(51) Int. Cl.⁷ .......................... G01G 23/00; G01G 23/01
(52) U.S. Cl. .......................... 177/50; 73/1.13; 177/145; 177/262; 177/264
(58) Field of Search .......................... 73/1.13; 177/50, 177/145, 146, 200, 262–264

(56) References Cited

U.S. PATENT DOCUMENTS

| | | | | |
|---|---|---|---|---|
| 4,156,361 A | * | 5/1979 | Melcher et al. | ............... 73/1.13 |
| 6,194,672 B1 | * | 2/2001 | Burkhard et al. | ..... 177/210 EM |
| 6,420,666 B1 | * | 7/2002 | Baumeler et al. | ........... 177/145 |
| 6,557,391 B2 | * | 5/2003 | Luchinger | ................... 73/1.13 |
| 2002/0096371 A1 | * | 7/2002 | Weber | |

* cited by examiner

Primary Examiner—Randy W. Gibson  
(74) Attorney, Agent, or Firm—Friedrich Kueffner

(57) ABSTRACT

A weight set for an electronic balance has at least two different weights (15, 25, 26, 27, 28, 29) and a weight-receiving device (19) with receiving positions for each of the weights (15, 25, 26, 27, 28, 29). The weight set (2) has one lifter unit (17) per weight for the vertical movement of each individual weight (15, 25, 26, 27, 28, 29). The lifter units, which are equipped with a weight-seating device and reach through the weight-receiving device (19), are identical and are arranged parallel to each other in the weight set (2).

22 Claims, 5 Drawing Sheets

WEIGHT SET FOR AN ELECTRONIC BALANCE

BACKGROUND OF THE INVENTION

The invention relates to a weight set for an electronic balance, in particular for a comparator balance. The balance has a weighing cell and a weighing pan as well as a mechanism that supports the weighing pan and transmits the load to the weighing cell. The weight set has at least two different weights and a weight-receiving device with at least two receiving positions, each of which is assigned to one of the weights.

Comparator balances are used to perform accurate determinations of the mass or volume of weight pieces. Their application is predominantly in governmental institutes of metrology.

In EP-A-1 098 177, an automatic calibration apparatus for test weights is disclosed which, in addition to a weighing unit and a processor unit, has three different weighing pans to hold standard weights, compensation weights and test weights. The test weights are weighed either on a single weighing pan with a weight-exchanging device that reaches through openings in the weighing pan, or on a plurality of pans that are arranged vertically above one another and where each of the pans has a fork-shaped mechanism to set down and lift up the test weights. The weight-exchanging mechanism is designed to receive an external standard weight and several test weights. In addition, the apparatus has internal ring-shaped compensation weights in a concentric arrangement on a likewise ring-shaped, concentrically arranged lowering and lifting mechanism for individually setting the compensation weights on the weighing pan as well as lifting them off the weighing pan. This apparatus is suitable for performing automated calibrations of test weights according to the principle of "derivative weight calibration" in a short amount of time and with little human effort.

Devices for the lowering and lifting of weights are also known in balances, in particular laboratory balances with an internal calibration device. A device of this kind is described in EP-A-0 955 530. An elongated calibration weight is arranged so that it can be set down on a fork-shaped receiver, where the receiver is attached to an extension of the input lever arm of the first lever in a force-transmitting mechanism. An electrically powered lifting device serves to lift the calibration weight against a stop where it is immobilized in a rest position against a counter-holder, or to lower the calibration weight onto the fork-shaped receiver. On its cylindrical circumference, the weight has circular grooves for positive seating on the receiver and additional grooves for positive seating against the counter-holder.

Also known among the state of the art are balances with two built-in calibration weights, where the latter are arranged either side-by-side as disclosed, e.g., in U.S. Pat. No. 4,566,548, or one above the other, preferably at locations vertically below the center of gravity of the weighing pan, as described in JP-A-10019652. In both cases, a motor-driven lifting and lowering mechanism serves to set down either one calibration weight alone or both weights together onto a receiver device that is coupled to the load-receiving part of the balance.

An arrangement of two or four calibration weights of approximately equal mass is disclosed in JP-A-09043043, where the weights in their weighing positions are arranged in a horizontal plane at equal distances to the right and left and/or to the front and back of the vertical axis through the center of the weighing pan. A mechanism driven by a single motor serves to lower and lift each of the weights separately on and off the load-sensitive element of the balance. In addition to the calibrating function, this arrangement also allows a determination of eccentric load errors and linearity errors of the balance.

Devices of the present state of the art suffer from the drawback that there is either only one drive source provided to lower and lift the individual weights of the respective weight set on and off the balance pan, which makes the process very time-consuming, or if there are individual drive sources provided, the arrangement is complex and involves exacting mechanical requirements.

In particular, EP-A-1 098 177 describes a weighing device that is built in a complicated way, with three different weighing pans. The arrangement is adapted to the specific calibration method that is disclosed with the invention and therefore offers little flexibility or modularity. Also, the mechanism for lowering and lifting the ring-shaped, concentrically arranged internal compensation weights on and off the weighing pan is constructed in a complicated way, as the individual lifter devices have to be engaged in each other in order to reach the compensation weight that is to be moved. Furthermore, difficulties have be expected in getting access to the individual lifting devices in case they require servicing.

OBJECT OF THE INVENTION

It is therefore the objective of the invention to provide a weight set for a balance with the distinguishing traits that the weight set takes up a small amount of space, particularly in the horizontal dimensions, that it has a modular configuration, and that its lifter elements can be easily exchanged if they require servicing.

SUMMARY OF THE INVENTION

The foregoing objective is met by a weight set with the characteristic features of claim 1. An electronic balance with a weighing cell and a weighing pan as well as a device that carries the weighing pan and transmits the load to the weighing cell is equipped with a weight set that includes at least two different weights and a weight receiver device with receiving positions for each of the weights. There is a lifter unit for each weight, which is equipped with a seating device for the weight and reaches through the weight receiving device to move each individual weight vertically up and down. The lifter units are identical to each other and are arranged parallel to each other in the weight set.

The invention offers the advantage that the individual lifter units provided for each weight allow the weights to be rapidly set on as well as lifted up from the balance pan. Due to the parallel arrangement of the lifter units and of the weights, the functions of putting the weights on the weight receiver device and subsequently taking them off again are realized with a low level of mechanical complexity. Servicing is made easy by the good accessibility and the exchangeability of the individual lifter units. Furthermore, the inventive concept provides for a compact arrangement of the weights in the weight set, with a compact width so that eccentric loading errors are to a large extent avoided.

Each lifter unit has a drive unit for the motor-driven vertical movement to place a weight on the weight-receiving device and subsequently lifting the weight off again.

In a preferred embodiment, the weight-receiving device is suspended from the device that supports the weighing pan and introduces the load, and the center of gravity of the weight-receiving device lies on a vertical line through the center of gravity of the weighing pan. In particular, the connection between the weight-receiving device and the pan-supporting device includes a coupling that largely avoids the introduction of a torque associated with putting weights on the weight-receiving device.

In an advantageous embodiment, the weight-receiving device consists of two carrier plates running parallel at a distance from each other, with weight-receiver openings adapted to the shapes of the weights, and further openings for the lifter units.

In particular, a balance that is equipped with the inventive weight set has a holder device consisting of two parallel plates arranged at a distance from each other, with cutouts for the lifter units and/or further cutouts for the weights, where the further cutouts are designed to conform to the shape of the weights. The lifter units in this arrangement are attached to one of the plates of the holder device, and the holder device as a whole is attached to the balance housing. The weight-receiving device is arranged between the two plates of the holder device.

In an advantageous further developed version of the invention, the weights have an elongated shape with a regular polygon profile, or a cylindrical shape with a round or elliptical profile.

The weights, which are preferably made of a non-magnetic material, are provided with positioning and seating grooves, so that they can be securely positioned on the weight-receiving device and/or the seating device.

It is particularly advantageous if the arrangement of the weights in the weight set is mirror-symmetric relative to a plane that runs perpendicular to the carrier plates. The weight values are structured in binary multiples and sub-multiples of the base unit of 1 kg (i.e., 1 kg multiplied by any integer power of 2). This allows measurements of test weights in a continuous range between a maximum and minimum rated load for which the balance is designed.

In addition, the maximum load of a balance can be varied by installing a selected combination of weights in the weight set instead of the full complement of weights.

BRIEF DESCRIPTION OF THE DRAWINGS

Details of the inventive weight set for a balance as well as the arrangement of the weight set in the balance will become clear from the description of an embodiment of a comparator balance that is represented in the drawings, wherein.

DETAILED DESCRIPTION OF PREFERRED EMBODIMENTS

Figure 1:
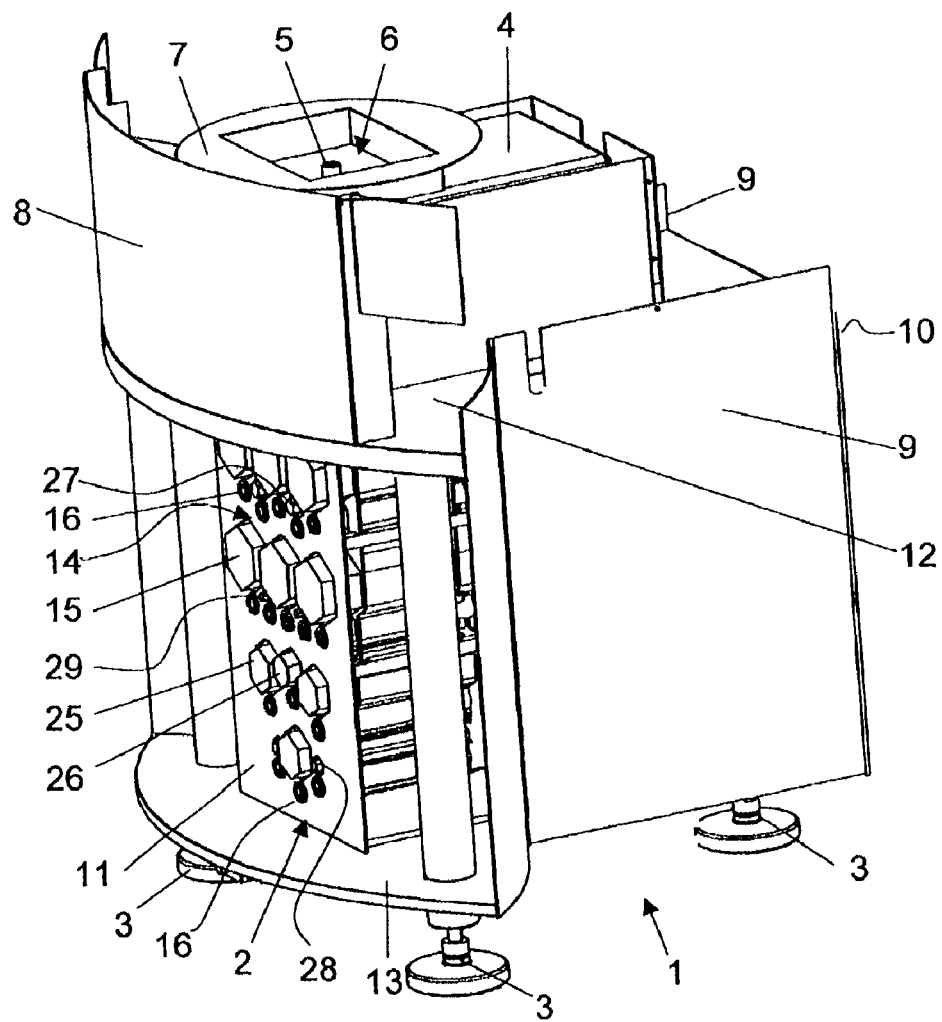
FIG. 1 shows a part of a comparator balance with a built-in weight set in a perspective view.

FIG. 1 gives a perspective view of a part of a comparator balance for high load values. The part illustrated in the drawing includes primarily a housing 1 in which the weighing device is accommodated. The only part of the weighing device that can be seen in the drawing is a weight set 2 arranged in the lower part of the housing 1. The housing 1 itself stands on three feet 3 which are height-adjustable so that the entire balance can be adjusted to a level position. A separate weighing cell housing 4 that contains the weighing cell (not visible in the drawing) can be seen in the upper part of the housing 1. A connector piece 5 that serves to introduce the load into the weighing cell and connects the weighing pan (not shown) to the weighing cell protrudes upwards through a passage opening of the weighing cell housing 4. The connector piece 5 is arranged at the center of a rectangular recess 6 of a shielding device 7 whose main purpose is to protect the access to the weighing cell as well as the weighing pan from air drafts. Additional protection is provided by an upper front panel 8, side panels 9, and a rear panel 10. The protective panels are sheet metal parts of the housing 1.

The weight set 2, which is normally covered by a lower front panel (omitted in the drawing for clarity), has a holder device consisting of two plates 11, 11', only one of which can be seen in the drawing. The holder device is attached to the intermediate stage floor 12 and reaches down to the base floor 13 of the housing 1. Several weights 15, 25, 26, 27, 28, 29 of different sizes with a hexagonal profile protrude from the plate 11 through hexagonal openings 14. Visible below each of the weights 15, 25, 26, 27, 28, 29 are the rearward surfaces 16 of the individual lifter units that are associated with each of the weights 15, 25, 26, 27, 28, 29. The lifter units are individually attached to the plate 11 by means of a retaining ring. Each of the lifter units has a weight-seating device, as will be explained in more detail below.

Figure 2:
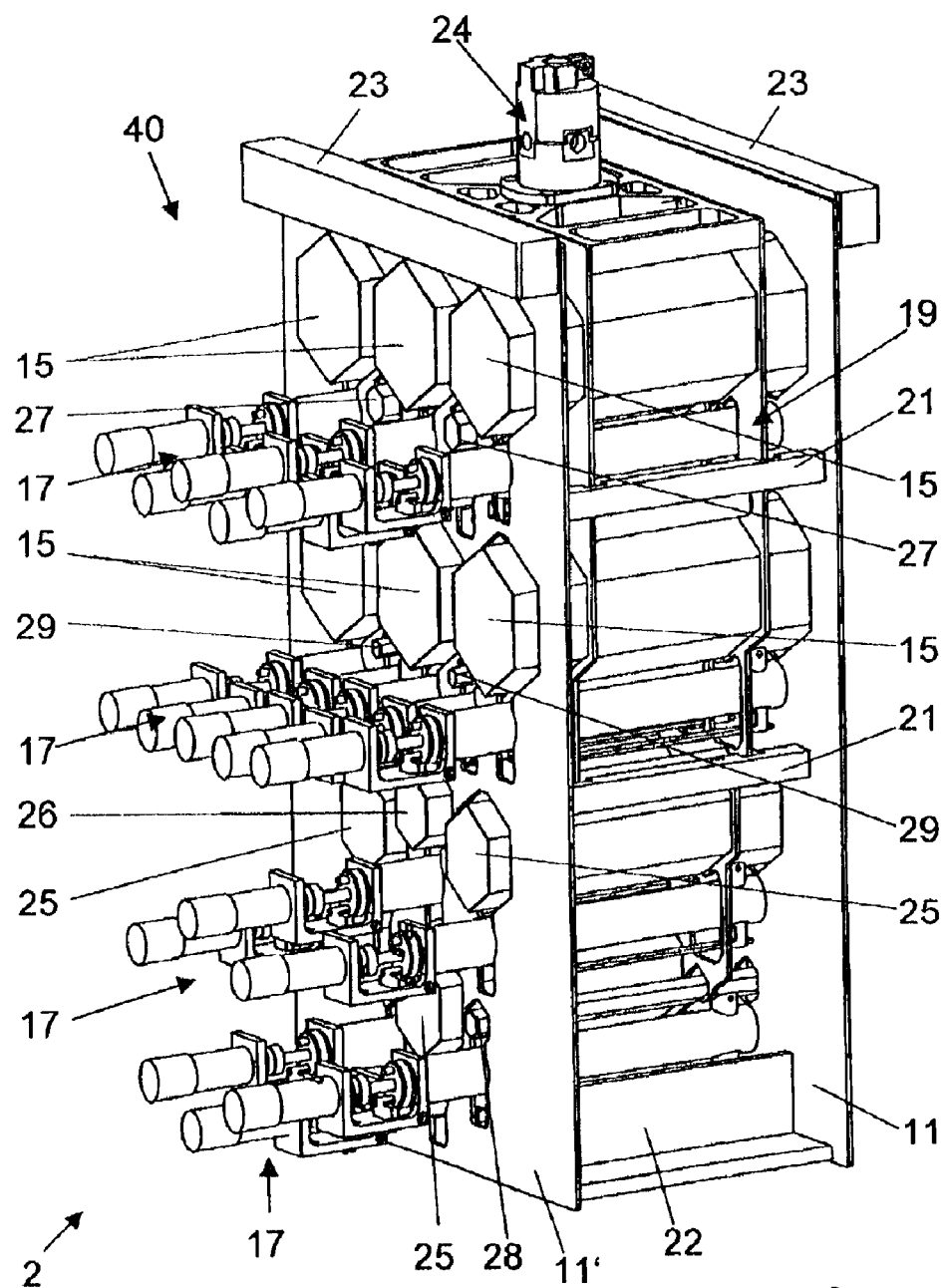
FIG. 2 shows a weight set with a holder device for lifter units in a perspective view.

FIG. 2 provides an overall perspective view of the weight set 2. The plate 11' of the holder device for the weight set, located on the opposite side from the plate 11 of FIG. 1, extends towards the viewer, running at an angle to the frontal viewing direction. The weight set 2 consists of the weights 15, 25, 26, 27, 28, 29, the weight-receiving device 19, the lifter units 17, as well as the weight-seating devices that are attached to each of the lifter units. The weight set 2 is confined primarily within a holder device 40 consisting substantially of two parallel plates 11, 11' that extend in the vertical direction, spaced at a distance from each other.

The holder device 40 serves to fasten and guide the lifter units 17 that are arranged parallel to each other, to protect and guide the weight-receiving device 19, and to guide the weights 15, 25, 26, 27, 28, 29 which, likewise, are arranged parallel to each other. Therefore, the plates 11, 11' have hexagonal openings 14, 14' for the weights 15, 25, 26, 27, 28, 29 and substantially round openings 18, 18' for the lifter units 17. In the plate 11', the hexagonal openings 14' are connected to the substantially round openings 18', and the latter have rectangular extensions at the top and bottom (see FIG. 4). In the plate 11, the hexagonal openings 14 are separated from the substantially round openings 18 by narrow material portions (see FIG. 4). The two plates 11, 11' are held at a defined distance from each other by means of spacer struts 21. On both sides at the lower end, there are in addition angular-profiled stabilizing struts 22. To fasten the holder device to the intermediate floor 12, connector bars 23 are attached along the upper borders of the plates 11, 11'.

The weight-receiving device 19 is arranged inside the holder device 40 between the two plates 11, 11'. A coupling 24 serves to suspend the weight-receiving device 19 from the hanger element that transmits the load to the weighing cell. The hanger element also holds the connector piece 5 that carries the weighing pan (see FIG. 1).

The weight set 2 illustrated in the drawings has a total of sixteen weights 15, 25, 26, 27, 28, 29 of different sizes and nominal weight values. The weight values are structured in binary multiples and submultiples of the base unit of 1 kg (i.e., 1 kg multiplied by any integer power of 2) and can be put on the weight-receiving device 19 in any combination up to a maximum total weight of 64 kg. However, the highest of the binary values, i.e., 32 kg and 16 kg, are made up of identical 8 kg-weights, so that 8 kg is the maximum nominal value of the weights in the set. The limitation to 8 kg makes it possible to use identical lifter units 17 for all of the weights 15, 25, 26, 27, 28, 29. The six 8 kg-weights 15 are arranged in the upper portion of the weight set 2. The nominal weight value of 8 kg is represented by two 4 kg-weights 25, which are arranged about halfway between top and bottom, to the right and left of an imaginary axis of symmetry of the weight set 2. A third 4 kg-weight 25 is supported at a position in the middle, below the two other 4 kg-weights; the 2 kg-weight 26 is supported at a position in the middle, above them. The weight value of 1 kg is represented by two 500 g-weights in order to maintain the symmetry and save space. Likewise, the nominal value of 500 g is represented by two 250 g-weights, and the value of 250 g is represented by two 125 g-weights. It is self-evident that the weights required to make up a given weight value are put on the weight-receiving device 19 simultaneously. The concept of splitting the weights 15, 25, 26, 27, 28, 29 in the manner just described has the purpose of optimizing the weight set 2 with regard to a desired degree of compactness and balanced distribution of the weights, for example as a way to avoid eccentric load errors.

To use a weight set of the foregoing description in a comparator balance, the weights do not need a high level of accuracy. In fact, they can deviate by as much as about 0.5 g from their nominal values. The reason for this lies in the working principle of a comparator balance. On the one hand, a weight under test is compared against a standard weight; and on the other hand, the comparator balance of the present description is a so-called window comparator, in which a preliminary equilibrium is established by mechanical means and only a relatively small weight difference is measured electronically using the principle of electromagnetic force compensation. Thus, one may consider using a standard kind of commercially available bar stock material for the fabrication of the weights, which reduces the cost. However, the weights are preferably made from a non-magnetic material, for example brass.

Sixteen individual but identical lifter units 17 for putting the weights 15, 25, 26, 27, 28, 29 on and off the weight-receiving device 19 are arranged parallel to the lengthwise direction of the weights and reach through the plates 11, 11' as well as through the weight-receiving device 19. The function of the lifter units 17 is described below in the context of FIG. 5.

Figure 3:
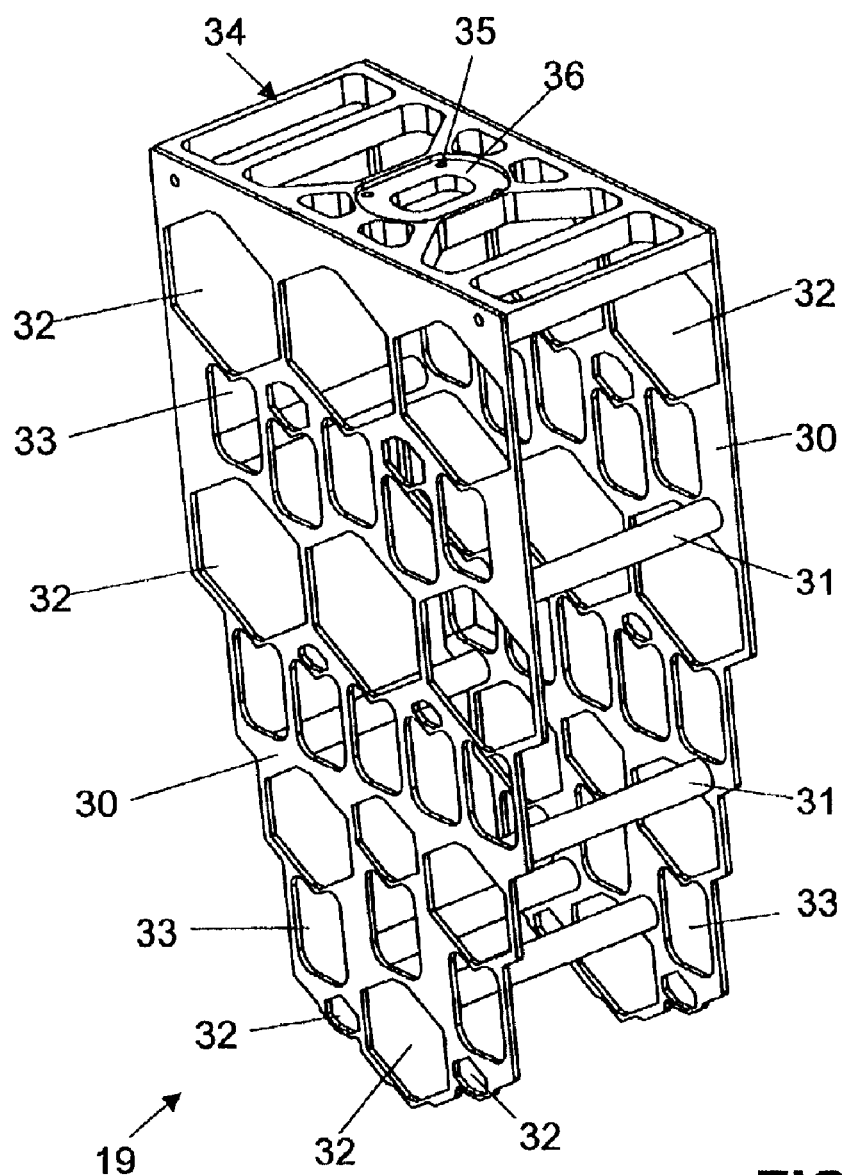
FIG. 3 represents a weight-receiving device of the inventive weight set in a perspective view.

As shown in FIG. 3, the weight-receiving device 19 consists substantially of two parallel vertical carrier plates 30 that are spaced apart and connected to each other by transverse cylindrical members 31. In particular, at the top of the weight-receiving device 19, there is a carrier 34 that is perforated by several break-through openings and runs at a right angle to the vertical carrier plates. At its center, the carrier 34 has a recess 36 with four threaded holes 35 for the installation of the coupling 24 that connects the weight-receiving device to the weighing cell (see FIG. 2).

Each of the carrier plates 30 of the weight-receiving device 19 has a total of sixteen hexagonal receiver openings 32 for the weights 15, 25, 26, 27, 28, 29 and thirteen rectangular openings 33 for the lifter units 17. Three more lifter units 17 are arranged below the three receiver openings at the bottom and are not passing through the weight-receiving device 19. The size of each opening 32 is adapted to the size of the weight 15, 25, 26, 27, 28, 29 that is received by the opening.

The arrangement of the weights 15, 25, 26, 27, 28, 29 in the weight-receiving device 19 is designed to achieve a relatively compact width for the weighing device so that eccentric loading errors are to a large extent avoided. On the other hand, the space between the floor 13 and the intermediate floor 12 is usable in almost its entire height to accommodate the weight-receiving device 19. The weight of the weight-receiving device 19 by itself is kept very small in order to minimize the dead load of the weight set 2. For this reason, the carrier plates 30 are preferably made of a light metal and shaped with a decreasing width towards the bottom end. Further in response to the requirement of a light-weight design for the weight-receiving device 19, the weights 15, 25, 26, 27, 28, 29 and lifter units 17 are arranged in a compact spatial layout.

The weight set 2 according to the invention follows a modular concept, as it is not necessary for all receiver positions to be occupied by weights. Due to the symmetric arrangement of the weights it is possible, for example, to leave out the six 8 kg-weights and to operate the balance, in particular a comparator balance, up to a maximum load of 16 kg. Alternatively, only four of the 8 kg-weights are left out, so that the balance is operable with a maximum load of 32 kg. Other combinations of the weights are conceivable to set the maximum load for a balance without making any changes in the mechanical design of the balance. The different amount for the maximum load is achieved merely through the selection of the weights of the weight set.

Figure 4:
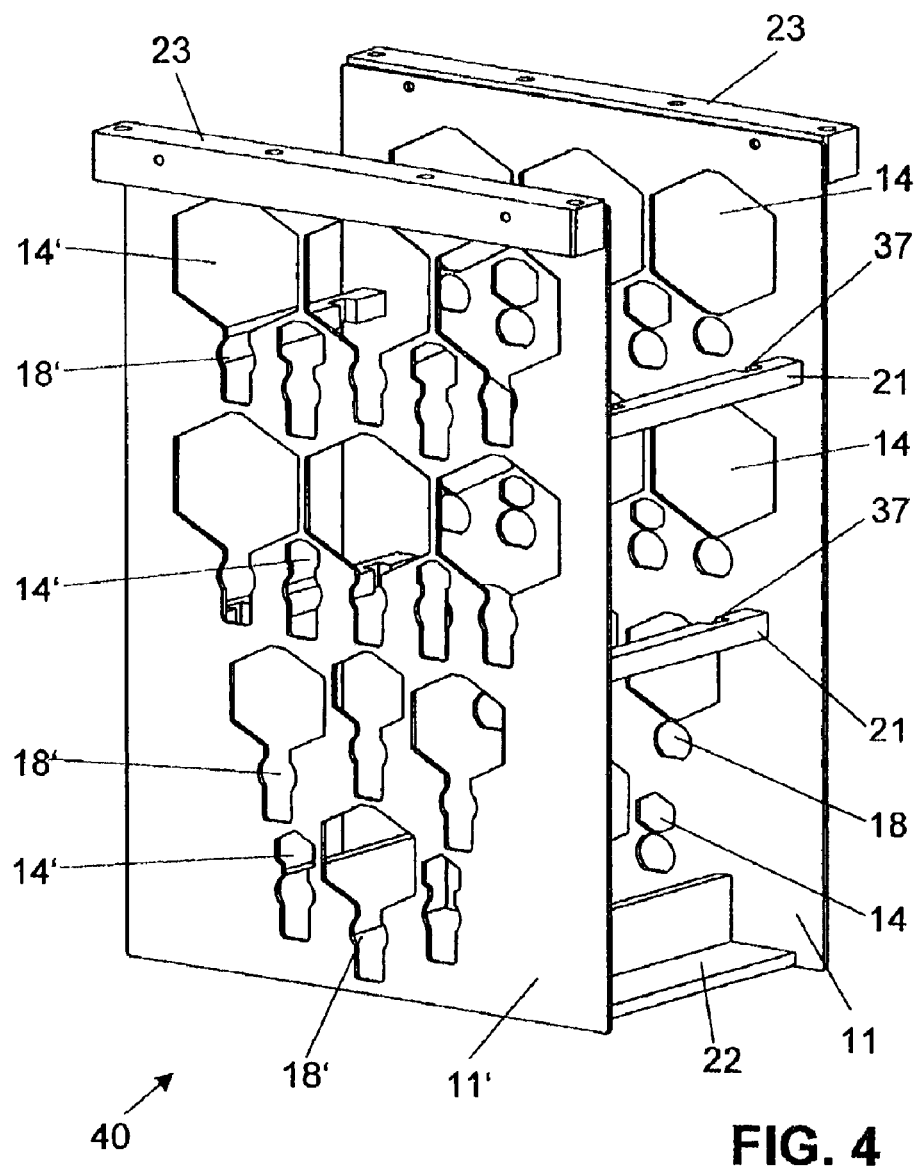
FIG. 4 represents a holder device for lifter units in a perspective view.

FIG. 4 shows the holder device 40, likewise in a perspective representation. The differences in the openings 14 and 18 of the plate 11 in comparison to the openings 14' and 18' of the plate 11' were described already in the context of FIG. 2, but can be seen more clearly in FIG. 4. The openings 18 are substantially circular except for a flat section at the bottom. The flat section has the purpose to keep a lifter unit 17 that is seated in the opening from turning, as the flat section of the opening matches a flat section on the circumference of the otherwise round body of the lifter unit 17. As can also be seen, the openings 18' in the plate 11' for the lifter units 17 have rectangular extensions at the top and bottom. Each of the spacer struts 21 that are arranged between the plates 11, 11' has two recesses 37 cut out on its inward-facing side near the plates 11, 11'. The recesses serve to guide the two carrier plates 30 of the weight-receiving device 19.

Figure 5:
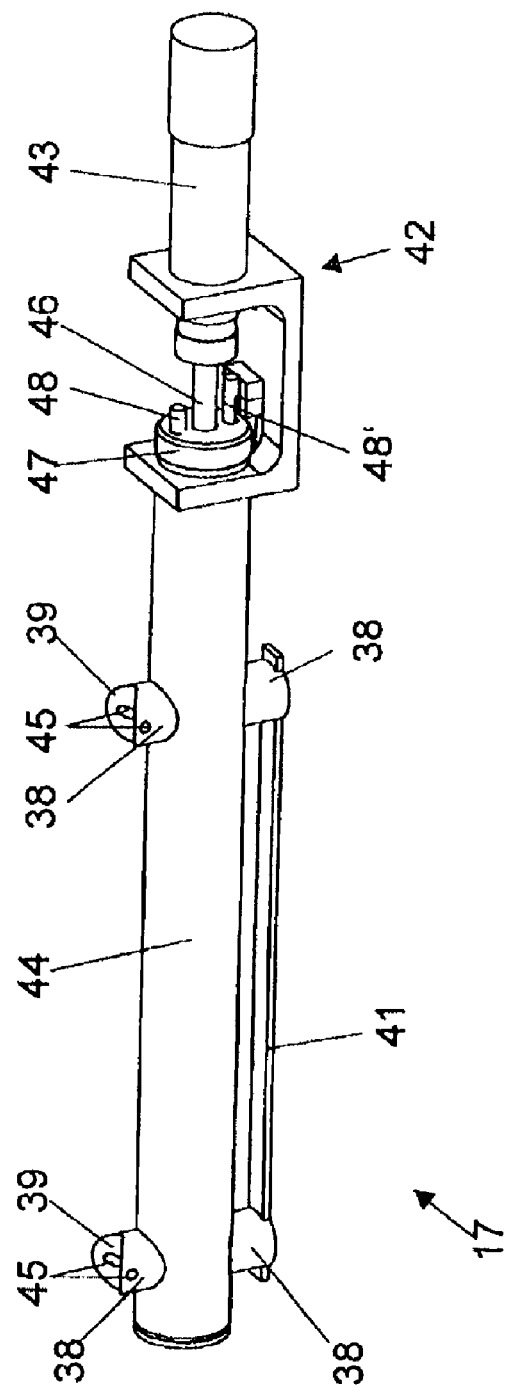
FIG. 5 shows a lifter unit of the inventive weight set in a three-dimensional view, as seen from the side.

FIG. 5 gives a three-dimensional side view of a lifter unit 17. In their parked position, the weights 15, 25, 26, 27, 28, 29 (not shown in FIG. 5) are seated on a weight-seating device. The weight-seating device is formed substantially by two lifter bolts 38 that pass through the cylindrical body 44 of a lifter unit 17. The lifter bolts are arranged at a distance from each other, perpendicular to the longitudinal axis of the cylindrical body 44, and protruding from the latter at the top and bottom. To seat the weights in a defined position, the lifter bolts 38 have V-shaped seating notches 39 at the top. At least one of the notches 39 is equipped with a transverse bolt that engages one of the positioning grooves that are provided on the weights 15, 25, 26, 27, 28, 29. The transverse bolts themselves are not shown in FIG. 5, but the bore holes 45 for the transverse bolts are indicated. At their bottoms, the lifter bolts 38 are joined by a connecting bar 41 to prevent the lifter bolts from turning about their vertical axes while they move up and down. A drive unit 42 with a motor 43 is part of the lifter unit and is shown to the right in the view of FIG. 5. Each of the lifter bolts sits on an eccentric (arranged inside the cylindrical body 44 and therefore not visible in the drawing) that is part of the drive unit 42. A disk 47 that is fixed on the driving shaft 46 has two pegs 48, 48' set at 180° from each other, functioning as end stops to define the raised and lowered position of the lifter bolts 38. Thus, the lifter units 17 move the weights 15, 25, 26, 27, 28, 29 vertically, i.e., at a right angle to the lengthwise dimension of the weights.

The lifter units 17 can be removed from the holder device 40 in a simple manner, and they can be individually replaced in a service case.

A high-capacity comparator balance as described herein, in particular a so-called window comparator, is used for an accurate determination of weights. The weights that are tested on comparator balances can be test weights, primarily of a standardized design, which are used in a governmental metrology institute, in which case one or more of the test weights are placed on the weighing pan. Alternatively, the objects to be weighed can be industrially manufactured articles of any type or form, as for example turbine blades, where the weights of the blades on a turbine have to be matched or balanced with the highest degree of accuracy.

A window comparator, as the term is understood in the present context, always operates at its full nominal weighing capacity, so that the weighing cell is always exposed to the same load conditions. To make up the required full load on the balance, the weight of an object under test is compensated mechanically by means of compensation weights, such as the weights of the weight set of the present invention, and only a narrow differential weight range is electronically equilibrated. The electronic weighing range is selected with an appropriate width and resolution, so that the measurement uncertainty is not caused predominantly by the circuit noise of the electronic weighing system.

The mechanical compensation takes place between the respective loads acting on the two lever arms of the balance beam, i.e., on one side the weight or weights under test together with the weight-receiving device of the weight set, and on the opposite side a leveraged counterpoise. In the process of the mechanical compensation or equilibration, an appropriate combination of the weights in the set are loaded onto the weight-receiving device, so that the remaining weight difference between the two sides is less than the smallest weight increment in the binary structure of the weight set.

The aforementioned remaining weight difference is balanced electronically according to the principle of electromagnetic force compensation. Thus, the difference that can be electronically compensated can be as large as the value of the smallest of the weights that are provided in the binary structure of the weight set. Thus, even test weights of large denomination can be determined accurately.

The comparator balance may further be equipped with a load-exchanging device to put a sequence of individual test weights or groups of test weights on the balance one after another. A process for the accurate determination of test weights by either a direct or derivative method can thereby be automated.

With the binary step structure of the weights in the weight set 2, complemented by the electronic determination of the remaining weight difference, the comparator balance of the foregoing description has the capability to calibrate not only metric test weights with the highest degree of accuracy, but also non-metric test weights, or even industrially manufactured articles of arbitrary weight. In other words, the comparator balance is capable of measuring weights over a continuous range up to 64 kg.

Of course, there is a large diversity of further possibilities for the design of a weight set. In particular, it is conceivable to use weights with an elongated shape that have different profiles, e.g., triangular, quadratic, rectangular, or in shapes of other regular polygons, and to optimize the arrangement of the weights to achieve a narrow width of the weight set combined with a minimum weight of the weight-receiving device itself. The weights could still be set on and lifted from the weight-receiving device by identical lifter units with likewise identical drive units, with an individual lifter/drive unit provided for each weight. A circular or elliptical profile is likewise conceivable for the elongated weights.

In principle, the weight set as described herein can be used in all balances where relatively large loads have to be determined with a high degree of accuracy. Alternatively, a weight set according to the invention could also be installed as a calibration weight set in a balance designed for smaller loads, although in this case the weight values would be different and smaller than in the embodiment described above. It is also conceivable to operate a low-capacity balance with a weight set according to the invention, using a method of mechanical and electronic compensation analogous to the concept described above in order to achieve the highest possible degree of accuracy.

LIST OF REFERENCE SYMBOLS 1 housing
2 weight set
3 feet
4 weighing-cell housing
5 connector piece
6 rectangular recess
7 shielding device
8 upper front panel
9 side panel
10 rear panel
11,11' plate
12 intermediate floor
13 floor
14,14' opening for weight
15 8 kg-weight
16 rearward surface of lifter unit
17 lifter unit
18,18' opening for lifter unit
19 weight-receiving device
21 spacer strut
22 stabilizer strut
23 connector bar
24 coupling
25 4 kg-weight
26 2 kg-weight
27 500 g-weight
28 250 g-weight
29 125 g-weight
30 carrier plates
31 transverse member
32 receiving openings for the weights
33 openings for lifter units
34 carrier
35 threaded hole
36 recess
37 recess
38 lifter bolt
39 V-notch 40 holder device
41 connecting bar
42 drive unit
43 motor
44 cylindrical body
45 bore hole
46 driving shaft
47 disk
48,48' pegs

What is claimed is:

1. A weight set for an electronic balance, said balance having a weighing cell, a weighing pan, and a weighing-pan-carrier device to introduce the load of an object placed on the weighing pan into the weighing cell; the weight set comprising at least two different weights (15, 25, 26, 27, 28, 29), a weight-receiving device (19) with receiving positions for each of the weights (15, 25, 26, 27, 28, 29), one lifter unit (17) per weight for moving each individual weight (15, 25, 26, 27, 28, 29) up and down, said lifter unit being equipped with a weight-seating device and reaching through the weight-receiving device (19); wherein the lifter units (17) are identical to each other and arranged parallel to each other in the weight set (2), and wherein the weight-receiving device (19) is coupled to the weighing-pan-carrier device.

2. The weight set according to claim 1, wherein the lifter units (17) are individually exchangeable.

3. The weight set according to claim 1, wherein each lifter unit (17) comprises a drive unit (42) for motorized vertical movement of a weight (15, 25, 26, 27, 28, 29) to lower the weight onto the weight-receiving device (19) and to lift the weight off the weight-receiving device.

4. The weight set according to claim 1, wherein the center of gravity of the weight-receiving device lies on a vertical line through the center of gravity of the weighing pan.

5. The weight set according to claim 4, wherein the weight-receiving device (19) is suspended from the weighing-pan-carrier device.

6. The weight set according to claim 5, wherein the weight-receiving device (19) is connected to the weighing-pan-carrier device through a coupling (24) designed to transmit no torque when weights (15, 25, 26, 27, 28, 29) are set on the load-receiving device.

7. The weight set according to claim 1, wherein the weight-receiving device (19) comprises two parallel, spaced-apart vertical carrier plates (30) with receiver openings (32) for the weights (15, 25, 26, 27, 28, 29), said receiver openings having shapes and sizes adapted to the weights (15, 25, 26, 27, 28, 29), and with openings (33) for the lifter units (17).

8. The weight set according to claim 1, wherein the electronic balance comprises a holder device (40), said holder device having two parallel, spaced-apart vertical plates (11, 11') with openings (18, 18') for the lifter units (17) and further openings (14, 14') for the weights (15, 25, 26, 27, 28, 29), said further openings being shaped to match the weights (15, 25, 26, 27, 28, 29).

9. The weight set according to claim 8, wherein the lifter units (17) are attached to one of the vertical plates (11).

10. The weight set according to claim 8 or 9, wherein the weight-receiving device (19) is arranged between the two plates (11, 11').

11. The weight set according to claim 1, wherein the weights (15, 25, 26, 27, 28, 29) are elongated bodies with a polygonal cross-sectional profile.

12. The weight set according to claim 1, wherein the weights (15, 25, 26, 27, 28, 29) have a cylindrical shape with a round or elliptical cylinder base.

13. The weight set according to claim 11 or 12, wherein the weights (15, 25, 26, 27, 28, 29) are arranged in the weight set (2) so that their longitudinal axes are parallel to each other.

14. The weight set according to claim 13, wherein the weights (15, 25, 26, 27, 28, 29) and the lifter units are arranged in the weight set (2) so that their respective longitudinal axes are parallel to each other.

15. The weight set according to claim 1, wherein the weights (15, 25, 26, 27, 28, 29) have positioning- and receiving grooves for a stable positioning on the weight-receiving device (19) and on the weight-seating device.

16. The weight set according to claim 1, wherein the weights (15, 25, 26, 27, 28, 29) are made of a non-magnetic material.

17. The weight set according to claim 1, wherein the weights (15, 25, 26, 27, 28, 29) are arranged mirror-symmetrically relative to a plane that runs perpendicular to the carrier plates (30).

18. The weight set according to claim 1, wherein the weights (15, 25, 26, 27, 28, 29) have a binary step structure with regard to their weight values.

19. The weight set according to claim 18, wherein each weight value in the binary step structure can be split into a plurality of identical individual weights.

20. The weight set according to claim 19, wherein the individual weights belonging to a weight value in the binary step structure are arranged mirror-symmetrically relative to a plane that runs perpendicular to the carrier plates (30).

21. The weight set according to claim 1, wherein the maximum load of a balance can be varied by installing a selected combination of weights (15, 25, 26, 27, 28, 29) in the weight set (2).

22. A comparator-balance comprising a weight set according to claim 1.

* * * * *